(12) United States Patent
Birmingham et al.

(10) Patent No.: US 6,868,224 B1
(45) Date of Patent: Mar. 15, 2005

(54) METHOD AND APPARATUS FOR PROVIDING MULTIMEDIA PLAYBACK

(75) Inventors: Blair B. A. Birmingham, Toronto (CA); Cheryl B. Giblon, Thornhill (CA)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/305,380

(22) Filed: May 5, 1999

(51) Int. Cl.⁷ .............................................. H04N 5/91
(52) U.S. Cl. ........................................ 386/68; 386/75
(58) Field of Search ............................ 386/6–8, 39, 54, 386/52, 68–70, 75, 82–83, 96, 104–106; 358/908; 360/8, 31–32, 64; 348/468; 381/101; 700/94; 704/207, 9

(56) References Cited

U.S. PATENT DOCUMENTS

| | | | | |
|---|---|---|---|---|
| 4,367,499 A | * | 1/1983 | Hoshino et al. | 386/54 |
| 5,572,377 A | * | 11/1996 | Ueno | 360/8 |
| 5,664,044 A | * | 9/1997 | Ware | 386/75 |
| 5,668,917 A | * | 9/1997 | Lewine | 358/908 |
| 5,913,009 A | * | 6/1999 | Kuboji et al. | 386/68 |
| 5,991,109 A | * | 11/1999 | Taniguchi et al. | 360/64 |
| 6,091,886 A | * | 7/2000 | Abecassis | 386/83 |
| 6,144,799 A | * | 11/2000 | Ohnami | 386/68 |
| 6,166,780 A | * | 12/2000 | Bray | 348/468 |
| 6,279,018 B1 | * | 8/2001 | Kudrolli et al. | 704/9 |
| 6,324,337 B1 | * | 11/2001 | Goldwasser | 386/68 |

* cited by examiner

*Primary Examiner*—Thai Tran
*Assistant Examiner*—Christopher Onuaku
(74) *Attorney, Agent, or Firm*—Vedder, Price, Kaufman & Kammholz, P.C.

(57) ABSTRACT

During a fast forward search of a multimedia presentation, the audio portion of the multimedia presentation is pitch-adjusted and played back in order to assist the user in determining where within the multimedia presentation the playback currently is located. In another embodiment, the audio playback portion of the multimedia presentation can be buffered such that only intermittent portions of the audio are played back in such a manner that is audible to an end user in determining where in the multimedia presentation the playback routine is located. Another embodiment accommodates a multimedia presentation being reversed will have its audio portion buffered and played back in forward in order to assist the user in determining where in the multimedia presentation the rewind currently is. In addition, an individual word detect can be performed during the rewind whereby each word is individually detected and played forward after its detection.

19 Claims, 5 Drawing Sheets

METHOD AND APPARATUS FOR PROVIDING MULTIMEDIA PLAYBACK

FIELD OF THE INVENTION

The present invention relates generally to providing multimedia playback from stored media and more specifically to providing audio, visual, and closed-caption information at different rates than the originally recorded multimedia rate.

BACKGROUND OF THE INVENTION

Providing multimedia signals through the use of playback devices such as videocassette recorders (VCR), digital video disks (DVD), or other received signals is well known. Generally, when one desires to locate a specific portion of a stored multimedia recording, a fast, forward, or a fast rewind, is selected by the user in order to quickly locate a desired portion of the multimedia feature.

During fast forward or rewind of multimedia presentations, it is necessary for a user to visually monitor the display device in order to determine when a desired location of, the multimedia presentation is present. For example, when using a VCR, it is necessary for a user to monitor to television display in order to determine when the portion of the tape desired to be viewed is present. Depending upon the fast forward, or reverse speed of the playback, and the number of heads associated with the playback device, it can be difficult to ascertain one section of the video from another during fast forwarding, or reversing of the multimedia presentation.

One prior art option to assisting users in locating specific locations has been to set or reference a specific location on the recording media either by time, or distance into a recording at which to stop. However, this requires having knowledge of the multimedia presentation in advance in order to stop at a desired location.

Therefore, a method and apparatus for enhancing the ability to ascertain a desired location of a multimedia presentation is advantageous.

DETAILED DESCRIPTION OF THE DRAWINGS

During a fast forward search of a multimedia presentation, the audio portion of the multimedia presentation is pitch-adjusted and played back in order to assist the user in determining where within the multimedia presentation the playback currently is located. In another embodiment of the present invention, the audio playback portion of the multimedia presentation can be buffered such that only intermittent portions of the audio are played back in such a manner that is audible to an end user in determining where in the multimedia presentation the playback routine is located. In yet another embodiment of the present invention, a multimedia presentation being rewound would have its audio portion buffered and played back in forward in order to assist the user in determining where in the multimedia presentation the rewind currently is. In addition, an individual word detect could be performed during the rewind whereby each word is individually detected and played forward after its detection. This, too, would assist the user in monitoring the current location of a search using fast forward or rewind functions for playback devices.

Figure 1:
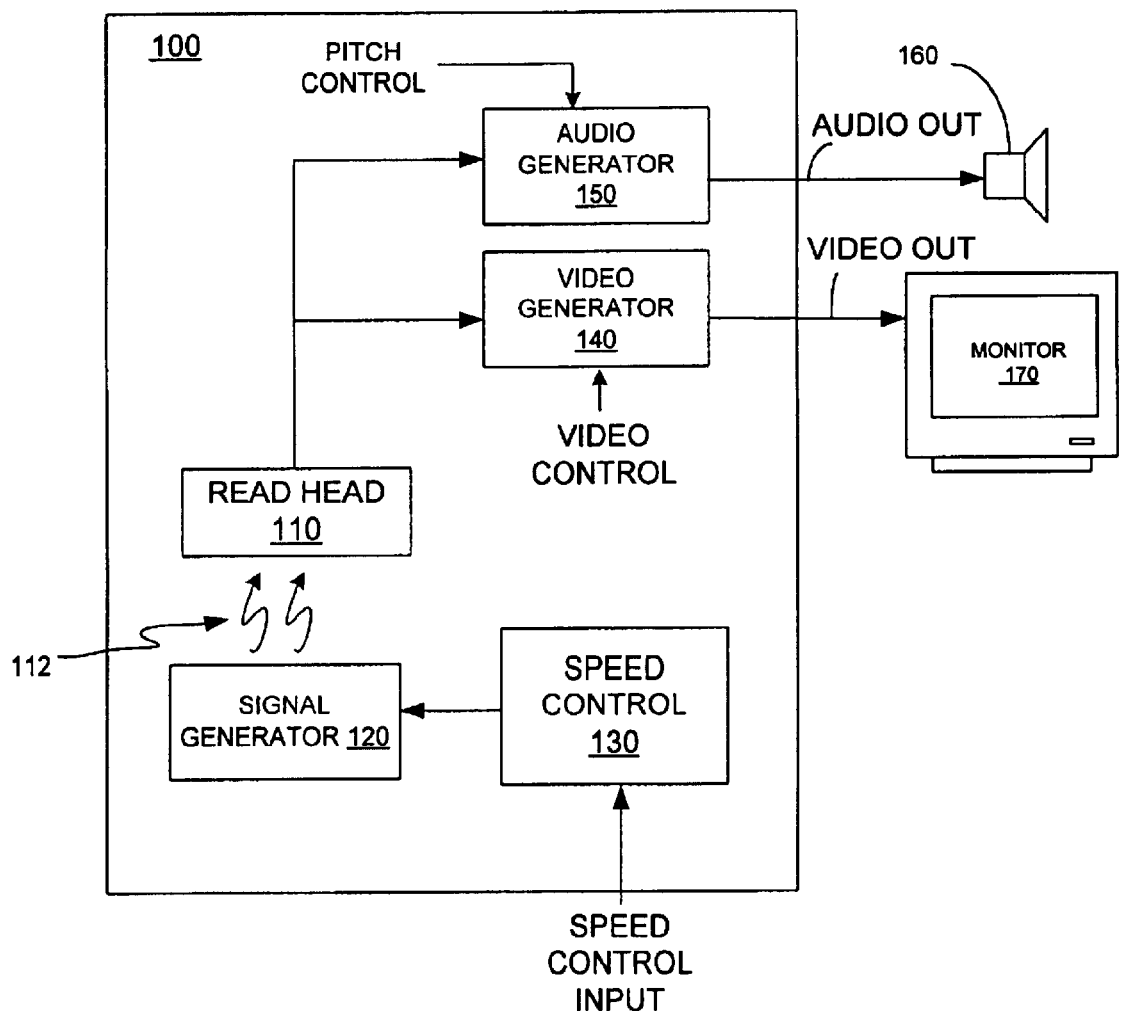
FIG. 1 illustrates in block diagram form a system in accordance with the present invention for providing multimedia signals in accordance with the present invention.

FIG. 1 illustrates a playback system 100 in accordance with the present invention. The playback system 100 includes a read head 110, audio generator 150, video generator 140, a signal generator 120, and a speed control 130.

A signal labeled Speed Control Input is received by the system 100, and in particular by speed control 130. The speed control 130 is connected to the signal generator 120 to provide control. The signal generator 120 provides signals 112 which are capable of being read by the read head 110. The read head 110 provides signals to the video generator 140 and the audio generator 150. The audio generator 150 receives a signal labeled Pitch Control and the video generator 140 receives a signal labeled Video Control. The video generator 140 provides a signal labeled Video Out and the audio generator provides a signal labeled Audio Out. Generally, the Audio Out signal is provided to a speaker 160 and the Video Out signal will be provided to a display device 170.

In operation, a speed control input is received by a speed controller 130. Traditionally, the speed control input is a fast forward rewind indicator such as is associated with a video cassette recorder (VCR). In other embodiments, the speed control input can be a variable fast forward/rewind input provided by an end user. For example, a VCR, DVD, or computer video multimedia playback program can have a variable control input controlled by the user. By using such a variable speed control input, it is possible for the user to increase or decrease the playback speed of a multimedia presentation. One use for changing the speeds is to search through the multimedia presentation to find a desired viewing location. Yet another reason for changing the speed through the speed control input is to allow a user to view a program at a faster rate. For example, a one-hour program can conceivably be viewed in 45 or 50 minutes using the invention herein.

The speed control block 130 in turn controls the speed at which the signal generator 120 provides signals 112 to the read head 110. The signal generator 120 may merely be a motor control controlling how fast a media, such as a VCR tape of laser disk, passes in front of a magnetic VCR or laser head. In another embodiment, the speed control 120 may control how fast digitally stored information is retrieved from storage media and provided to a read head, such as can be associated with a computer.

In response to the read head 110 receiving the signals 112 from the signal generator 120 video and audio signals are generated and provided to the video generator 150 and audio generator 140 respectively.

The video generator 140 converts the received signal from the read head into a video out signal capable of being displayed on a display device 170. In a traditional VCR environment, the video generator 140 will always provide the information received from the read head 110 at the video out signal. The present invention includes a Video Control signal that allows display of video to be turned on or off. For example, if a very high speed forward or rewind search is occurring, it may be desirable disable the video out signal because it does not have the clarity necessary for a user to receive any useful information.

The audio generator 150 receives the audio signal from the read head 110 and provides an audio out signal. In accordance with the present invention, the audio out generator 150 will perform a pitch adjustment on the audio signal in order to adjust for the change in pitch which occurs when a signal is sped up or slowed down in a traditional manner. The use of pitch shifting is well known in the recording arts industry where various sounds are pitch-controlled in order to generate desired audio effects. In accordance with the present invention, the received audio signal will generally be pitch-shifted to provide the pitch of the originally recorded voice or sound to be reconstructed.

By providing the original pitch, the audio out signal being played at an increased rate of speed will still maintain the normal pitch. Therefore, it will be possible for a user to hear the audio at the proper pitch, just faster. In other words, an actor speaking a line on a video tape would sound like the actor's normal voice spoken faster, as opposed to sounding like a "chipmunk" voice when played in a fast forward. By providing a pitch-adjusted audio output during fast playback, it is possible to assist the user in monitoring the current playback location of a multimedia playback device.

Figure 2:
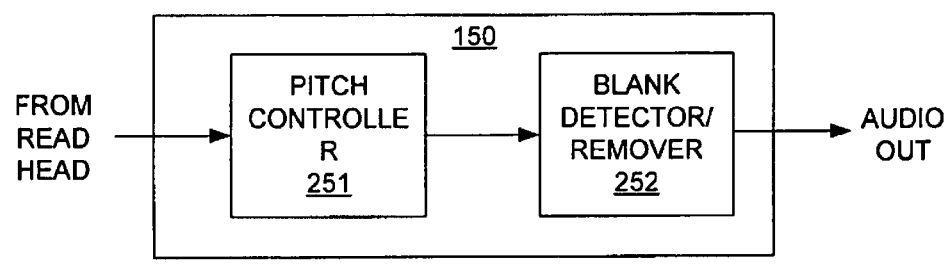
FIGS. 2–5 illustrate in block diagram form detailed views of portions of FIG. 1.

In other embodiments, it is possible for the audio generator 150 to further enhance the ability of a user to ascertain the present location in a multimedia presentation during a fast forward or rewind by removing any blanks in speech. This is illustrated by the detailed block diagram of the audio generator 150 as illustrated in FIG. 2. FIG. 2 illustrates a pitch controller 251 followed by a blank detector/remover 252. One skilled in the art will recognize that in another embodiment, it is possible for the blank remover 252 to precede the pitch controller 251.

The blank detector/remover 252 detects and removes spaces between spoken words or sound. By detecting and removing blank spaces in speech, it is possible to compress the speech to allow more speech could be presented in the same amount of time, or each word of a given amount of speech to be spoken over a longer period of time during fast forwarding of a multimedia presentation.

Figure 3:
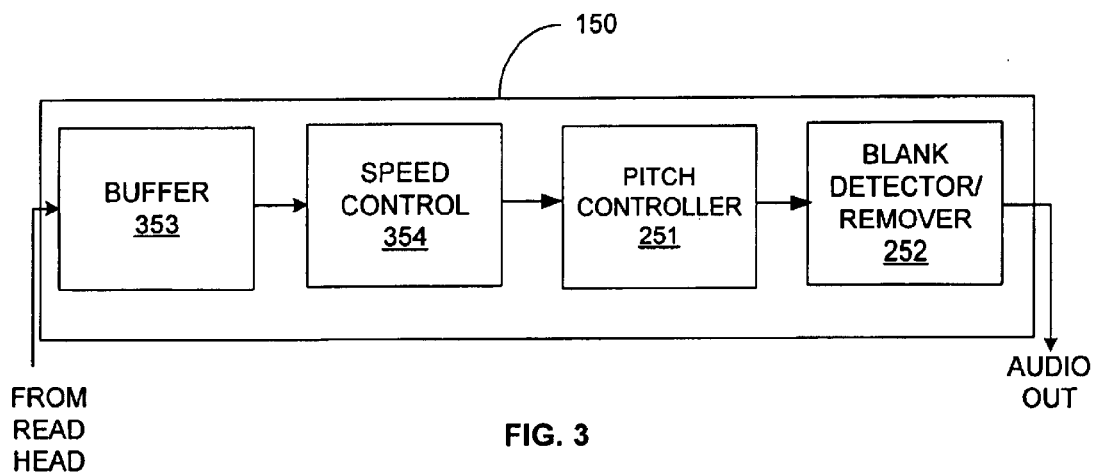

FIG. 3 illustrates yet another embodiment of the audio generator 150 in accordance with the present invention. In FIG. 3, the audio signal being received by the audio generator 150 is stored in a buffer 353. The buffer 353 in turn is connected to a speed control portion 354 which in turn is connected to the pitch controller 251, which in turn is connected to the blank remover 252. By using a buffer 353 it is possible to buffer portions of the audio signal and playback just certain portions of the signal to compensate for when the playback of a multimedia presentation is at a rate too high to provide pitch shifted speech that is audible. For example, in one implementation, it is possible to buffer a predetermined amount of audio, for example 10 seconds, and playback only 10 seconds at an audible rate.

Once the predetermined amount of audio is played back, the next predetermined amount of audio is buffered and subsequently pitch-shifted and played back. The amount of speech actual buffered, and the speed at which it is played back is capable of being controlled by the user based on user supplied inputs (not shown). The speed controller 354 accesses the audio buffer 353 to provide the audio to the pitch controller. When it is desirable to playback the buffered speech at a normal rate, the speed controller 354 is set to access the buffer 353 at a normal recording rate. The buffered data is then provided to the pitch controller 251 for pitch shifting, and the pitch adjusted signal is next provided to the blank remover 252, and finally output as an audio signal. In a similar manner, the speed 354 can be set to a higher playback rate in order to access the buffer 353 at a higher rate.

Figure 4:
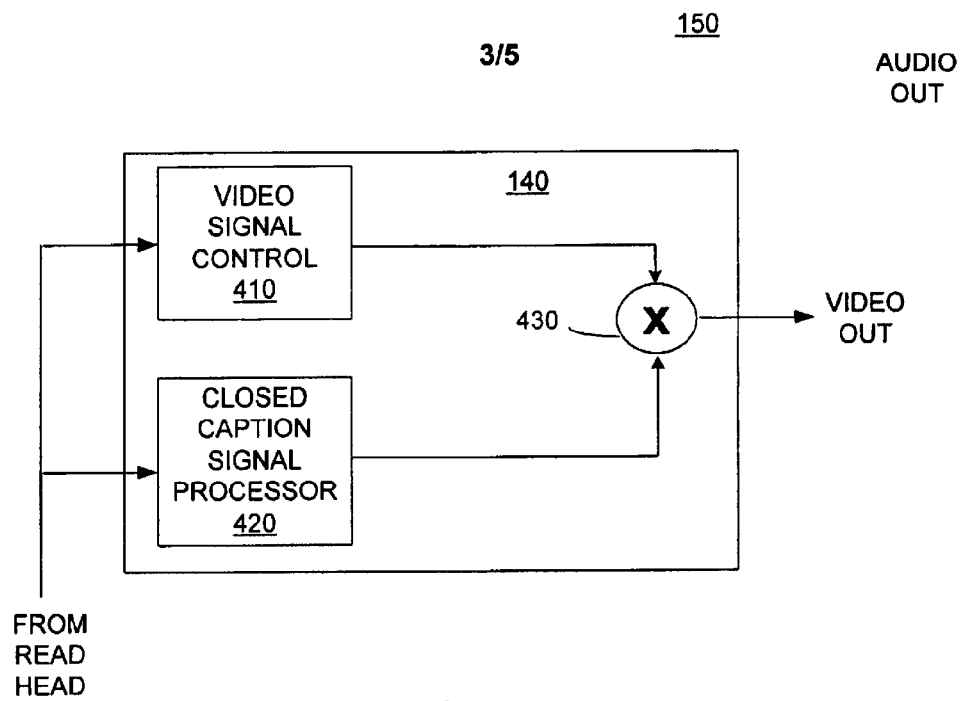

FIG. 4 illustrates an expanded view of the video generator 140. The apparatus of FIG. 4 illustrates support for a closed-caption signal processor 420. The specific embodiment illustrated in FIG. 4 includes a video signal control 410, a closed caption signal processor 420, and a video signal combination circuit 430.

In operation, the video portion of a multimedia presentation such as from a VCR is received and processed by the video signal controller 410 and output to the combination circuit 430. A closed-caption portion of the signal is received by the closed-captioned signal processor 420 and processed. The closed-captioned signal processor 420 can have a buffer in order to assure that rate at which closed-caption text is displayed on the display device is readable by a viewer. The closed-captioned information is provided to the closed-captioned output of the closed caption processor 420 at a rate which can be set by a user or to predetermined values.

Figure 5:
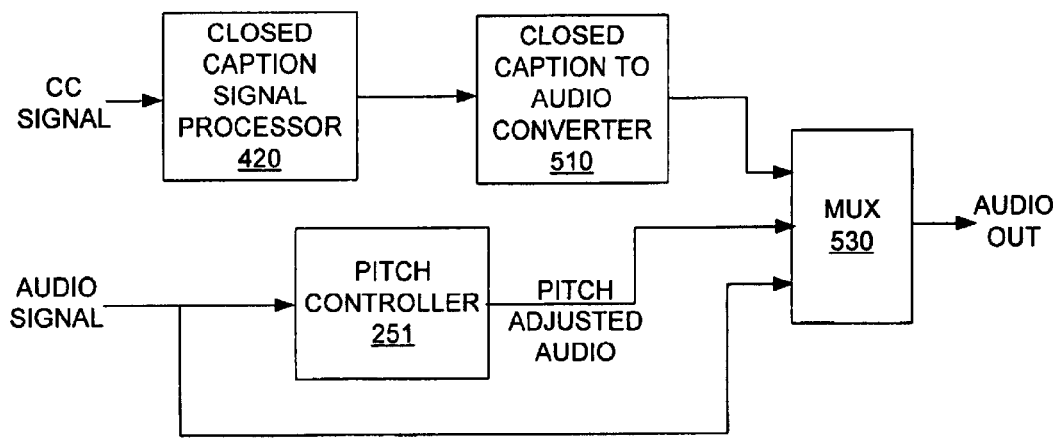

FIG. 5 illustrates yet another embodiment of the present invention. FIG. 5 illustrates a closed captioned signal labeled CC Signal being received by the closed-captioned portion 420. The closed captioned portion 420 is connected to a text-to-audio converter 510, which is connected to the input of a multiplexor 530. A signal labeled Audio Signal is received by the pitch adjust controller 520 which provides a signal labeled Pitch Adjusted Audio to a second input of the multiplexor 530. In addition, the Audio Signal is provided to a third input of the multiplexor 530. The multiplexor 530 provides an output signal labeled Audio Out.

In operation, the Audio Signal is received by both the pitch adjust controller 251 and the multiplexor 530. The pitch adjust controller 251 provides a Pitch Adjusted Audio signal to the multiplexor 530 at substantially the same time the fast forwarded, non-pitch adjusted signal, is provided to the third input of the multiplexor 530. The closed-captioned signal is received by the closed-captioned signal processor 420, which, as with the discussion in FIG. 4, would control the rate at which the closed-captioned information is output. The output from the closed-captioned processor 420 is provided to a text-to-audio converter 510. The text-to-audio converter 510 will convert the closed caption information to convert it into an audio signal. The audio signal would then be provided to the multiplexor 530.

Based upon the information generally provided by a user, either the synthesized closed-captioned audio will monitored, the pitch adjusted audio will be monitored, or the non-pitch adjusted audio will be monitored. In other embodiments, multiple audio signals can be output as well and listened to simultaneously, even though preferably, only one of the three signals will be monitored at a specific time.

In each of the previous embodiments, it is possible to monitor multimedia presentations being reversed, as well as fast forward. When rewinding video presentations, it is preferable to either word detect individual words and play them back in the proper forward manner, or to buffer defined portions of the audio signal for playback in pitch adjusted or non-pitch adjusted fast forward to assist the user in determining where in a rewind the multimedia presentation currently is located.

Figure 6:
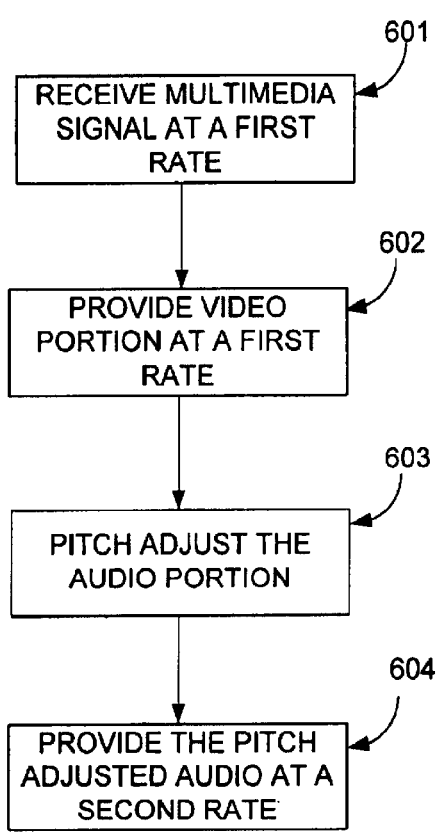
FIGS. 6–9 illustrates in flow diagram form methods in accordance with the present invention.

FIG. 6 illustrates a method in accordance with the present invention. At step 601, a multimedia signal is received at a first rate. Generally, the first rate will be either a fast forward or a reverse rate different than the actual recorded rate.

At step 602, the video portion of the multimedia signal is provided at the first rate. In operation, this would generally be the same rate at which the multimedia signal is received in step 601. For example, during the fast forward of a VCR, the video is displayed at substantially the same rate on the monitor at which the video data passes the video head of the VCR.

At step 603, a pitch adjusted audio portion of the multimedia signal is provided. By performing a pitch adjustment on the audio signal, it is possible to provide an understandable signal to the end user. Without such pitch adjustment of the audio portion of a multimedia signal, the audio will sound like a chipmunks, making it difficult for a user to ascertain the actual conversation. In addition, as previously discussed with specific embodiments, it is possible to buffer the audio signal and provide just portions of it in order to accommodate very high speed fast forwards, or rewind operations.

At step 604, the pitch-adjusted audio is provided at a second rate. In this embodiment, the user can select the actual rate at which the audio is played back. The actual playback rate can be accommodated by buffering portions of the audio in order to provide a more legible audio signal. In this embodiment, the first rate at which the video is provided is different from the recorded rate, and the rate at which the audio signal is provided can be different from that at which the video is provided. Note that by buffering, there is some synchronization lost between the video signal and the audio signal, but for purposes of ascertaining where in a multimedia location a current fast forward or rewind operation is located, the synchronization between the video and the audio portions is generally tolerable. Periodic gaps in the audio or video can be used to maintain synchronization to an acceptable level.

Figure 7:
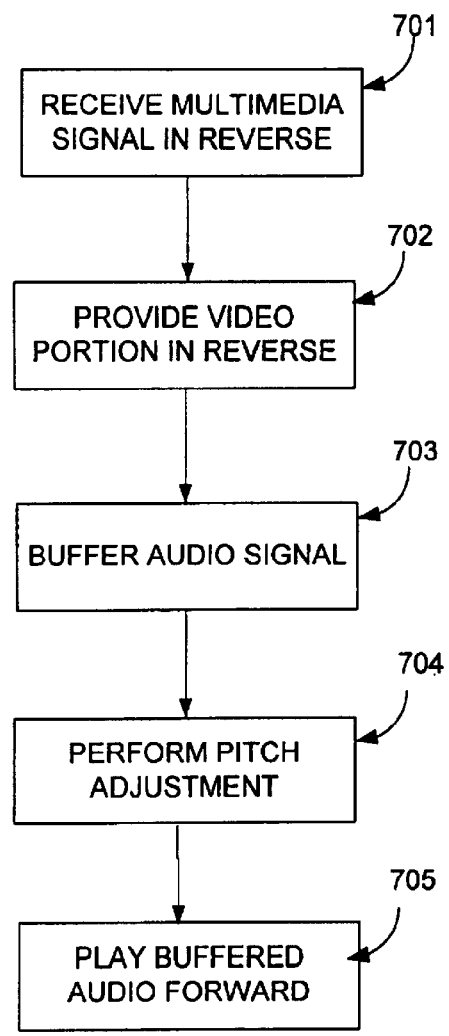

FIG. 7 illustrates a method in accordance with the present invention for providing audio during a rewind on a multimedia presentation. Step 701 is analogous to step 601 wherein the multimedia signal is being reversed.

At step 702, a video signal is provided in reverse.

At 703, a predefined amount of audio is buffered. In one embodiment, the amount of audio being buffered is the amount of audio needed to recreate a single word. In this situation, once a single word is detected in reverse it is played back in forward, whereby the next word in reverse is detected and played back in forward. In another embodiment, a predetermined amount of time of audio is recorded, or buffered, while being played in reverse. For example, it may be desirable to buffer 15 seconds of audio while rewinding to be played forward.

At step 704, the buffered audio is pitch adjusted in the forward direction, and subsequently played as pitch adjusted forward audio at step 705.

Figure 8:
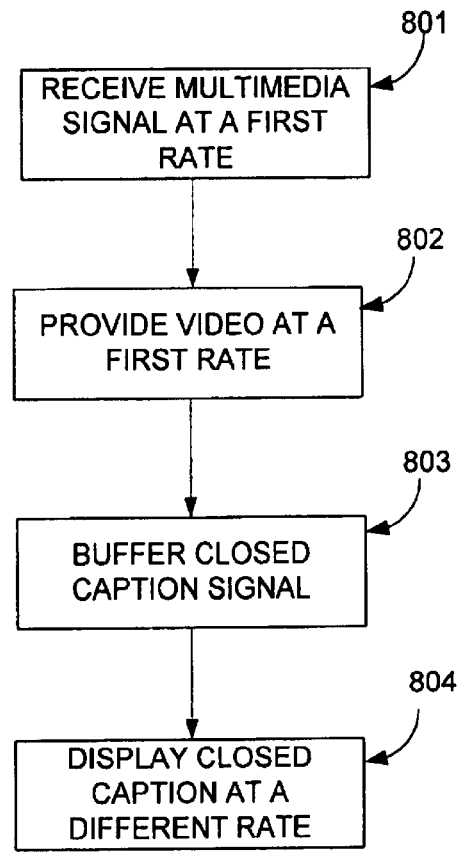

FIG. 8 illustrates yet another embodiment of the present invention. At step 801, a multimedia signal is received at a first rate. At step 802, the video portion of the multimedia signal is provided. At step 803, the closed-captioned portion of the video signal is buffered. At step 804, the closed caption portion of the video signal is displayed at a different rate than that of the video. In another embodiment at step 804 would include using a text-to-audio conversion on the display on the closed-captioned portion whereby the synthesized text is played the audio channels.

Figure 9:
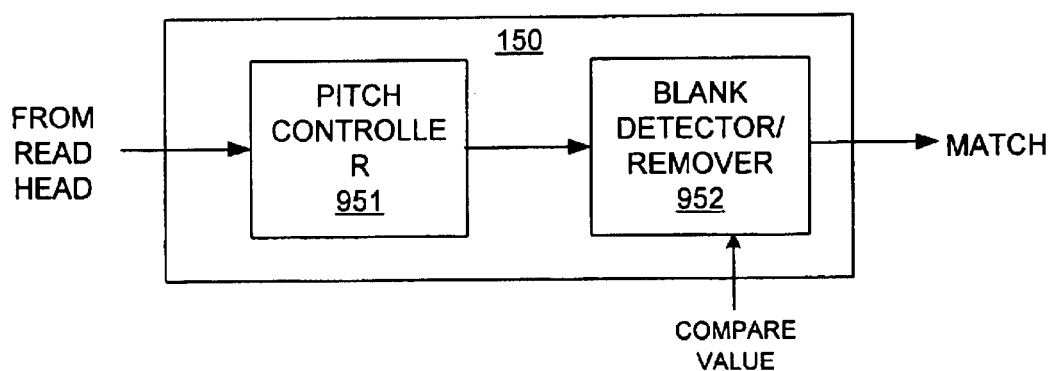

FIG. 9 illustrates another embodiment in accordance with the present invention, whereby speech recognition is used in order to index into a multimedia presentation. For example, if a user wants to fast forward, or reverse, to a portion of video where the words are known, the user would enter the desired mode of operation and speak or otherwise enter these words. The device will then fast forward, or rewind, and compare this speech to the recorded speech. When the desired speech is found, a match signal will be generated indicating the location has been identified.

The circuit portion of FIG. 9 can be part of the Audio Generator 150 of FIG. 1. FIG. 9 receives audio from a read head which may or may not be pitch adjusted by the Pitch Adjust Controller 951. The audio is compared to the compare value which is a representation of an audio signal to be found in the received audio. Generally, the compare value will be a digital representation of an audio signal. When the match is detected by the Audio Compare block 952, a match signal is generated. When a match is detected, the fast forward or reverse function will generally stop.

It will be understood by one skilled in the art that other variations of the present invention can be implemented without departing from the intent of the invention herein. For example, the precise location of the speed controller, pitch controller, and blank remover of FIG. 3 may be varied in accordance with other embodiments of the present invention. In addition, the use of buffers may also include the use analog-to-digital conversion techniques, and the reciprocal digital-to-analog conversions. Also, one skilled in the art will recognize that the video portion of the multimedia presentation can be turned off during audio playback.

The present invention has disclosed an improved playback method for multimedia devices that assist the user in determining a current location in the fast forward or fast reverse in a multimedia presentation by providing a legible audio signal, or a legible closed-captioned signal. This is an improvement over the prior art whereby the audio is either not provided or the audio provided was illegible because of a chipmunk-type sound.

We claim:

1. A multi-media playback device comprising:
   a read-head to receive a video signal and an audio signal;
   a speed control to vary a rate at which the video signal and the audio signal are received by the read-head such that the video and audio signals may be received at a first rate, wherein the first rate represents a fast forward rate or a rewind rate;
   a video-out generator coupled to the read-head to receive the video signal, and having an output to provide a video output representative of the video signal such that the video output is, at the first rate when the video signal is received at the first rate;
   a pitch controller coupled to receive the audio signal provided to the pitch controller at the first rate when the video output signal is the first rate to change the pitch of the audio signal, and having an output to provide a pitch adjusted signal at a second rate, wherein the second rate is different from the first rate; and
   an audio-out generator coupled to the pitch controller to receive the pitch adjusted signal at the second rate, and having an output to provide an audio signal of the pitch adjusted signal, such that the video output may be substantially coordinated with the audio signal.

2. The device of claim 1, wherein the second rate may be selected by a user.

3. The device of claim 1, wherein the multimedia playback device comprises a video cassette recorder.

4. The device of claim 1, wherein the multimedia playback device comprises a digital video player.

5. The device of claim 1, wherein the multimedia playback device comprises a computer system.

6. The device of claim 1, wherein the pitch controller receives an input for varying the pitch of the audio signal.

7. The device of claim 1, further comprising input coupled to the speed control to vary the rate at which the video signal and audio signal are received by the read-head.

8. The device of claim 1, further comprising an audio blank remover coupled to receive the audio signal to remove at least a portion of the space between recorded words.

9. A video playback method, the method comprising:
   receiving from a common input port a first signal representing visual data and a second signal representing audio data;
   rendering the first signal at a first rate; and
   rendering only a portion of the second signal at a second rate, wherein the portion of the second signal includes a predetermined percentage of the second signal and the predetermined percentage is based on the second rate.

10. The method of claim 9, wherein the first and second signals are received at the first rate.

11. The method of claim 10, wherein the first signal is a video signal, including a closed-captioned signal.

12. The method of claim 9, wherein the second rate is slower than the first rate.

13. A method of providing a multimedia signal, the method comprising:
   providing a video portion of the multimedia signal at a first rate different than a recorded rate;
   providing an audio portion of the multimedia signal at a second rate different than the recorded rate, but playing the audio portion at substantially a same pitch as a recorded pitch, wherein the first rate is different than the second rate; and
   playing the video portion of the multimedia signal when a video variable is in a first state, and not playing the video when the video variable is in a second state.

14. The method of claim 13, wherein the first and second rates are faster than the recorded rate.

15. The method of claim 14, wherein first rate is faster than the send rate.

16. The method of claim 14, wherein the first rate is slower than the: second rate.

17. The method of claim 14, wherein the first rate is slower than the recorded rate.

18. The method of claim 17, wherein the slower rate includes a reverse rate.

19. The method of claim 17, wherein when the slower rate includes a reverse rate, at least a portion of the audio portion of the multimedia signal is buffered and played at a forward rate.

* * * * *